No. 807,969. PATENTED DEC. 19, 1905.
S. H. SHELLEY.
ANIMAL TRAP.
APPLICATION FILED JUNE 15, 1905.

Witnesses:—

Inventor,
Sivert H. Shelley
By Geo. H. String
atty

UNITED STATES PATENT OFFICE.

SIVERT H. SHELLEY, OF SAN JOSE, CALIFORNIA.

ANIMAL-TRAP.

No. 807,969.     Specification of Letters Patent.     Patented Dec. 19, 1905.

Application filed June 15, 1905. Serial No. 265,349.

*To all whom it may concern:*

Be it known that I, SIVERT H. SHELLEY, a citizen of the United States, residing at San Jose, in the county of Santa Clara and State of California, have invented new and useful Improvements in Animal-Traps, of which the following is a specification.

My invention relates to improvements in animal-traps, and particularly in traps designed to catch gophers and rats.

The invention resides, essentially, in the use of a mirror disposed in such a manner as to reflect the image of the animal and of entrapping means in the path traversable by the animal.

It comprises details of construction which will be more fully set forth hereinafter, having reference to the accompanying drawings, in which—

Figure 1:
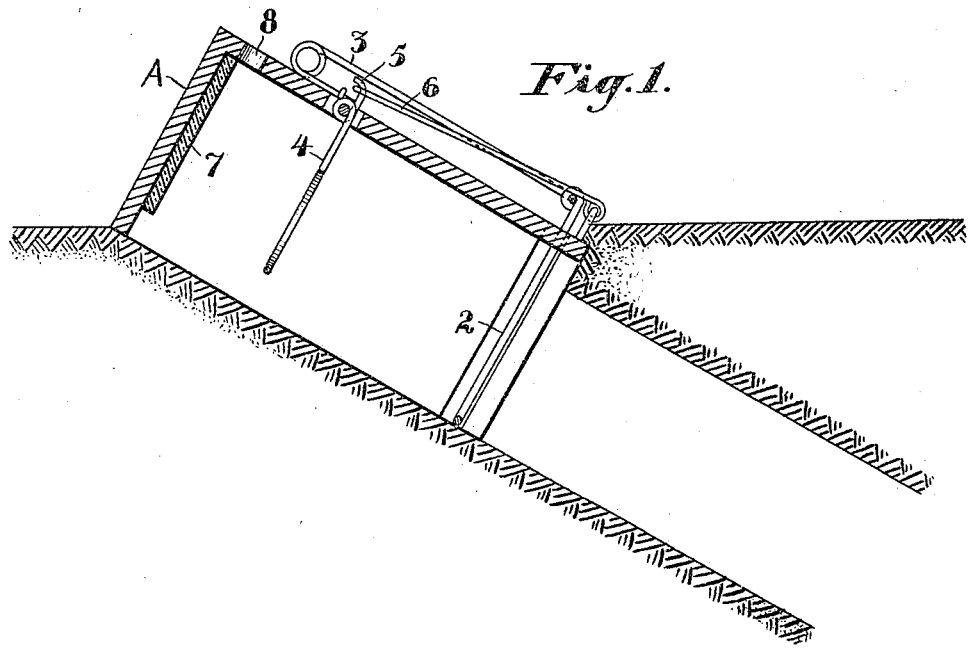
Figure 2:
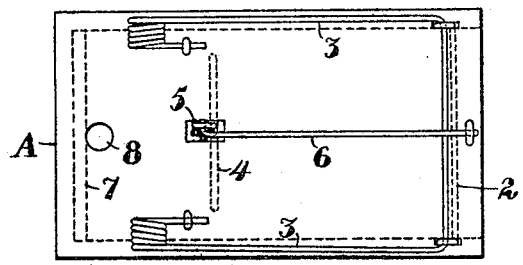

Figure 1 is a sectional view showing the application of my animal-trap to catch gophers. Fig. 2 is a plan view of the trap.

It has been discovered that animals such as gophers have an intense antipathy for other members of their kind under certain conditions. For instance, the invasion of the home of one gopher by another will lead to mortal strife between them, and where gophers are plentiful it has been observed that a gopher caught in a trap will have been attacked by other gophers. On the other hand, rats are noted for their sociability and curiosity, which qualities lead them to gather together at every opportunity.

The natural hate and distrust of one gopher for others of his species and the gregarious instincts of rats have been taken advantage of in the present invention.

A represents a box of suitable size open at one end and on the bottom.

2 is a loop jaw slidable in guides on the inner sides of the box and coöperating with the top of the box to catch and kill the animal. The ends of the loops extend up through the top of the box and connect with the spring-arms 3.

A trigger 4, pivoted to the top of the box, depends into the path of the animal to be caught, and its upper end forms a hook 5 to engage the bar 6, by which the trap is set.

A mirror 7, which is the essence of the invention, is secured to the inside of the closed end of the box, and a suitable opening 8 in the top and adjacent to the closed end of the box is made for the admission of light.

In practice where it is desired to catch gophers the operator makes a cut in the earth at the mouth of a gopher-hill large enough to receive the trap. The latter is set, inserted into the cut open end downward, and covered with earth to exclude all light except that which may enter through the opening 8. When a gopher discovers his front door open, he proceeds to investigate. As he approaches the trap the light through opening 8 causes his image to be reflected in the mirror and mistaking it for an intruder makes a rush at it, only to encounter the trigger and release the trap, resulting in his destruction. The operation of the device is practically the same where rats or non-burrowers are to be caught, the essential consideration being the disposition of the mirror relative to the source of light in such manner that the victim's image is reflected in the mirror. Whether hatred, sociability, or curiosity prompts action on the part of the victim, the result to him is the same.

Having thus described my invention, what I claim, and desire to secure by Letters Patent, is—

A gopher-trap comprising a box-like structure having a closed top, sides and one end, and adapted when placed in position in the animal's burrow to inclose a darkened chamber, said structure having its opposite end open, and having, also, a limited light-aperture near its closed end, a mirror in the chamber of the box and supported relative to said aperture and arranged to reflect light into the darkened chamber, and suitable entrapping means between the open end of the box and the mirror.

In testimony whereof I have hereunto set my hand in presence of two subscribing witnesses.

SIVERT H. SHELLEY.

Witnesses:
    H. F. DUSING,
    H. L. WARREN.